US010529262B2

(12) United States Patent
Schöne et al.

(10) Patent No.: US 10,529,262 B2
(45) Date of Patent: Jan. 7, 2020

(54) ILLUMINABLE EMBLEM

(71) Applicant: HELLA GmbH & Co. KGaA, Lippstadt (DE)

(72) Inventors: Heiko Schöne, Zell im Wiesental (DE); Ana Bizal, Freiburg im Breisgau (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 0 days.

(21) Appl. No.: 16/145,715

(22) Filed: Sep. 28, 2018

(65) Prior Publication Data

US 2019/0103042 A1    Apr. 4, 2019

(30) Foreign Application Priority Data

Sep. 29, 2017   (DE) .......................... 10 2017 217 507

(51) Int. Cl.
*G09F 13/18*        (2006.01)
*B60R 13/00*        (2006.01)
*B60Q 1/56*         (2006.01)
*F21V 8/00*         (2006.01)
*G09F 21/04*        (2006.01)

(52) U.S. Cl.
CPC .............. *G09F 13/18* (2013.01); *B60Q 1/56* (2013.01); *B60R 13/005* (2013.01); *G02B 6/005* (2013.01); *G09F 21/04* (2013.01); *G02B 6/002* (2013.01); *G02B 6/006* (2013.01); *G02B 6/0036* (2013.01)

(58) Field of Classification Search
CPC . G09F 2013/1804–1836; G09F 21/048; B60K 2370/33–345; B60R 13/005
See application file for complete search history.

(56) References Cited

U.S. PATENT DOCUMENTS

| 4,965,950 | A  |    | 10/1990 | Yamada |
|---|---|---|---|---|
| 7,726,862 | B2 | *  | 6/2010  | Lin ...................... G02B 6/0011 362/23.15 |
| 2004/0096182 | A1 | * | 5/2004 | Yamashita ........... G02B 6/0018 385/146 |
| 2007/0159846 | A1 | * | 7/2007 | Nishiyama ............. G01D 11/28 362/602 |
| 2012/0147617 | A1 |  | 6/2012 | Fritz et al. |
| 2014/0056015 | A1 | * | 2/2014 | Martoch .............. G02B 6/0018 362/487 |
| 2017/0357044 | A1 | * | 12/2017 | Kuramitsu ............... B60Q 1/50 |

FOREIGN PATENT DOCUMENTS

| DE | 32 39 783 A1 | 5/1984 |
| DE | 10153543 A1 * | 5/2003 ........... B60Q 1/0052 |
| DE | 10 2007 010 328 A1 | 4/2008 |
| DE | 10 2015 220 341 A1 | 4/2017 |
| GB | 2 435 937 A | 9/2007 |
| WO | WO 2017/ 220181 A1 | 12/2017 |

OTHER PUBLICATIONS

German Search Report, Application No. DE 10 2017 217 507.9, dated Aug. 8, 2018, 10 pgs.

* cited by examiner

*Primary Examiner* — Mariceli Santiago
(74) *Attorney, Agent, or Firm* — Paul D. Strain, Esq.; Strain & Strain PLLC

(57) ABSTRACT

The invention relates to an illuminable emblem, in particular for a motor vehicle, which is simple and inexpensive to produce and which permits easy identifiability in darkness.

9 Claims, 3 Drawing Sheets

ILLUMINABLE EMBLEM

CROSS-REFERENCE TO RELATED PATENT APPLICATIONS

This application is based upon and claims the benefit of priority from prior German Patent Application No. 10 2017 217 507.9, filed Sep. 29, 2017, the entire contents of which are incorporated herein by reference in their entirety.

TECHNICAL FIELD

The invention relates to an illuminable emblem, in particular for a motor vehicle.

PRIOR ART

In motor vehicles, emblems which, for example, identify the vehicle manufacturer or the vehicle type are known, in particular on the front end and at the rear. Such emblems, for example also as a flap closure element, may actuate a lock or serve as a radome and cover a radar sensor. The known emblems are produced, for example, as metal plaques or plastic plaques and are typically not visible or only poorly visible at night.

Recently, there has been interest in illuminating such emblems so that they are clearly visible even in darkness.

DE 10 2015 220 341 A1 has disclosed an illuminable emblem as a radome for covering a radar sensor. It has been shown here that, owing to the flat design of the light conductors and owing to the coupling of the illuminants on the rear side of the individual flat light conductors, a higher number of illuminants are required.

SUMMARY OF THE INVENTION, PROBLEM, SOLUTION, ADVANTAGES

The problem addressed by the invention is that of providing an illuminable emblem which is simple and inexpensive to produce and which permits easy identifiability in darkness, wherein a small number of required illuminants is preferred.

Said problem is solved by means of the features of claim 1.

An exemplary embodiment of the invention relates to an illuminable emblem, in particular for a motor vehicle, having a housing with a front cover which is transparent on a front side, and a rear-side housing base, which front cover and housing base are connected to each other and enclose a cavity, wherein a flat light conductor and a screen which is transparent at least in regions are arranged in the cavity such that light can emerge from the flat light conductor and can pass through the screen, wherein the flat light conductor has an at least partially encircling, raised edge region and a flat region which has at least one light coupling-in region at which at least one illuminant is arranged for the coupling-in of light into the raised edge region, wherein deflecting means are provided in the region of the raised edge region, said deflecting means being designed in such a manner that light is deflected by them from the at least one edge region in the circumferential direction of the raised edge region and/or into the flat region of the flat light conductor. The effect achieved by this is that only a few illuminants are sufficient in order to illuminate the flat emblem, and therefore the illuminable emblem can be produced simply and inexpensively because it reduces the use of illuminants required and nevertheless is easily identifiable even in darkness.

It is particularly advantageous if the raised edge region is provided with a recess in such a manner that an edge region of the recess is in the form of a flat deflecting means. The raised edge region itself serves as the deflecting means by means of the recess formed therein, or itself forms the deflecting means, and therefore preferably no deflecting means to be additionally fitted have to be provided.

In one exemplary embodiment, it is advantageous if the edge region of the recess is of curved or parabolic design and serves as the deflecting means. This produces a favorable light distribution in the encircling, raised edge region, which permits good illumination of the emblem.

In a further exemplary embodiment, it is expedient if the edge region of the recess forms two opposite flat deflecting means which are in particular arranged symmetrically with respect to each other. The effect achieved by this is that the light is fed from one or from two feeding-in regions on both sides into the raised edge region in order to permit good and more uniform illumination of the emblem.

It is also advantageous if the raised edge region has an end surface which serves as a coupling-in surface for the light of an illuminant, wherein the at least one illuminant lies against the coupling-in surface or is arranged adjacent thereto. The effect achieved by this is that the illuminants are arranged in an axial extension of the raised edge region, which saves construction space in the central region of the emblem.

It is also advantageous if the recess of the raised edge region is designed in such a manner that at least one partially released tongue is formed which has a coupling-in surface for the light of an illuminant, wherein the at least one illuminant lies against the coupling-in surface or is arranged adjacent thereto. This makes it possible for the illuminant or the illuminants to be arranged in the region of the raised edge region, which saves construction space overall.

It is particularly advantageous if two partially released tongues are formed which lie opposite each other, wherein the respective coupling-in surfaces lie opposite each other, and the illuminants are arranged between the two coupling-in surfaces of the tongues. This in turn achieves good illumination of the emblem.

It is also particularly advantageous if interfering optics are arranged in the transition region between the raised edge region and the flat region, said interfering optics serving as the deflecting means for deflecting the light from the raised edge region into the flat region. As a result, the light is conducted from the raised edge region into the flat region of the light conductor, and therefore the light can be uniformly distributed in the surface.

It is particularly advantageous if interfering optics are arranged in the flat region, said interfering optics serving as the deflecting means for deflecting the light out of the flat region. The light is therefore effectively conducted out of the surface to the front cover, which is transparent on the front side, and therefore the emblem appears illuminated when viewed from the front.

It is particularly advantageous if the interfering optics in the flat region are in the form of eroded surfaces on that side of the flat region which faces away from the front cover. These eroded, i.e. roughed, surfaces can be introduced simply and in a defined manner in the surface, which brings about a defined conducting out of the light.

Alternatively or additionally to the interfering optics, in particular the interfering optics in the flat region, the light conductor can also be produced from a material having dispersive properties, as a result of which a uniform distribution of light can be achieved. For example, the light conductor can be produced from a light conductor material, such as glass, PC, PMMA, silicone or the like, wherein diffusive particles are added to the light conductor material, by means of which the desired diffusive properties can be produced. Said diffusive particles then also serve as what are referred to as interfering optics.

Further advantageous refinements are described by the following description of the figures and by the dependent claims.

BRIEF DESCRIPTION OF THE DRAWINGS

The invention will be explained in more detail below on the basis of at least one exemplary embodiment with reference to the drawings, in which.

PREFERRED EMBODIMENT OF THE INVENTION

Figure 1:
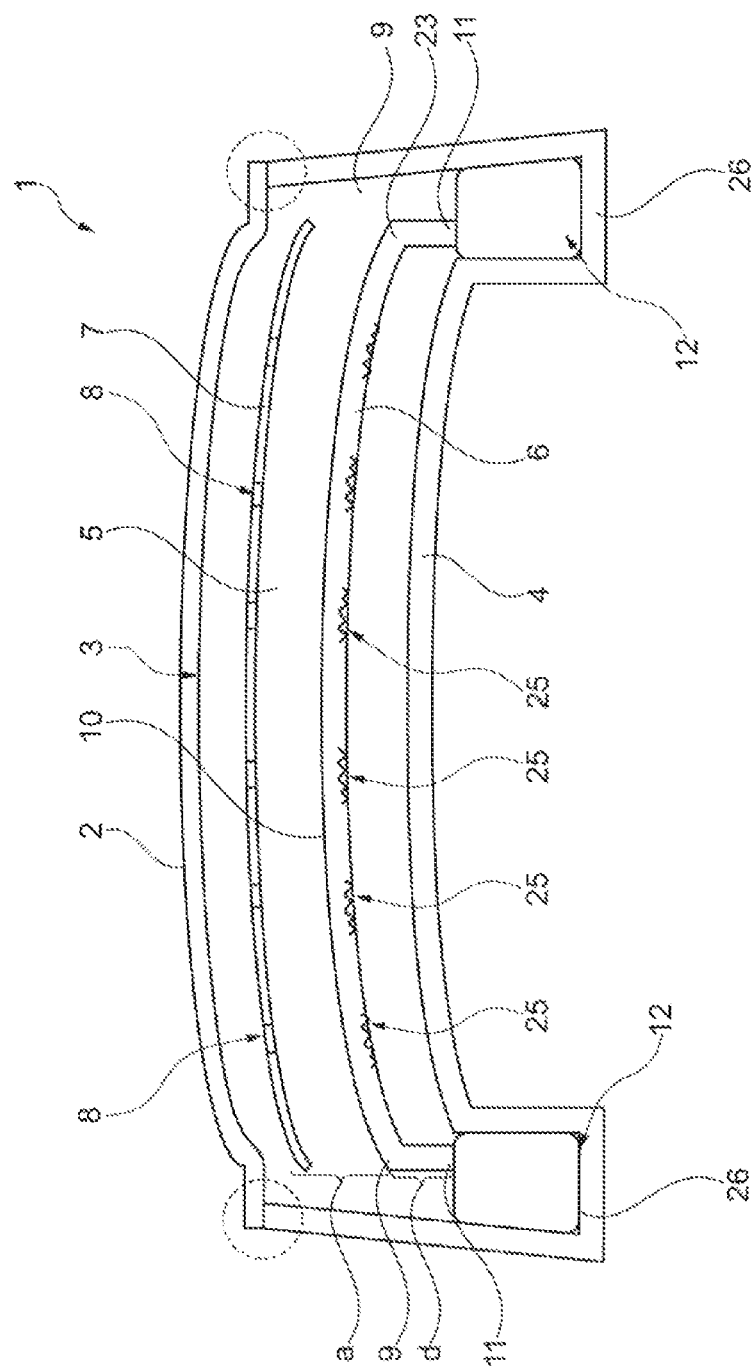
FIG. 1 shows a schematic sectional view of the emblem.

FIG. 1 shows a schematic sectional view of an illuminable emblem 1 according to the invention which is usable, for example, as a cover, as a flap closure element for a lock or as a radome, in particular at the front or at the rear of a motor vehicle. Such an illuminable emblem may also be used in other ways.

The illuminable emblem 1 has at least one illuminant which is switchable on and off and/or is also controllable in terms of its brightness and/or in terms of its color such that the emblem is illuminable. The emblem is illuminated here in particular from an inner region, such that, as viewed from the outside, in particular as viewed from the front of the emblem, said emblem is self-illuminating when the at least one illuminant is switched on.

The illuminable emblem 1 has a housing 2 with a front cover 3 which is transparent on a front side and with a rear-side housing base 4. In a frontal view, the emblem here is, for example, of round or angular design, depending on the configuration of the emblem. The front cover 3 and the housing base 4 are preferably connected to each other in a sealed manner in order to enclose a cavity which, in the sealed exemplary embodiment, protects the elements arranged in the cavity from dirt and moisture. Should this not be necessary, it is also possible for the housing not to be formed in a sealed manner. In this case, the front cover and the housing base would merely be formed in a manner connected to each other, such as connected to each other directly or indirectly.

A flat light conductor 6 and a screen 7 which is transparent at least in regions are arranged in the cavity 5, wherein the screen 7 is arranged between the front cover and the light conductor 6.

The screen 7 is therefore formed in a manner such that it is transparent at least in regions because regions 8 therein are recessed or formed in a transparent manner in order to allow light to pass from the light conductor 6 towards the front cover 3 so that an observer standing in front of the front cover 3 sees that the emblem 1 is illuminated. The light therefore exits from the flat light conductor 6 towards the front cover and passes through the screen 7 and through the front cover 3.

The recessed or transparent regions 8 can preferably produce a pattern which is intended to be identified as the pattern of the screen and therefore as the pattern of the emblem, for example a logo, etc.

The screen 7 and the light conductor 6 are typically formed spaced apart from each other in their central flat region and take up a spacing a.

The light conductor 6 and the housing base 4 are typically also formed spaced apart from each other in their central flat region and take up a spacing d.

The flat light conductor 6 has an at least partially encircling, raised edge region 9 and a flat region 10.

Figure 2:
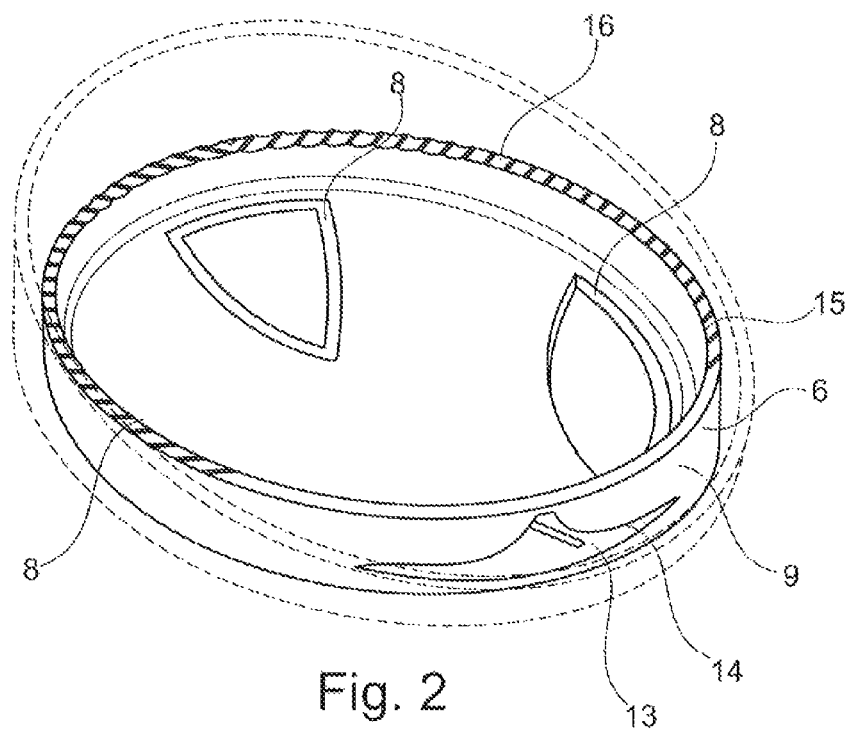
FIG. 2 shows a perspective illustration of parts of the emblem, as viewed from the rear side.
Figure 3:
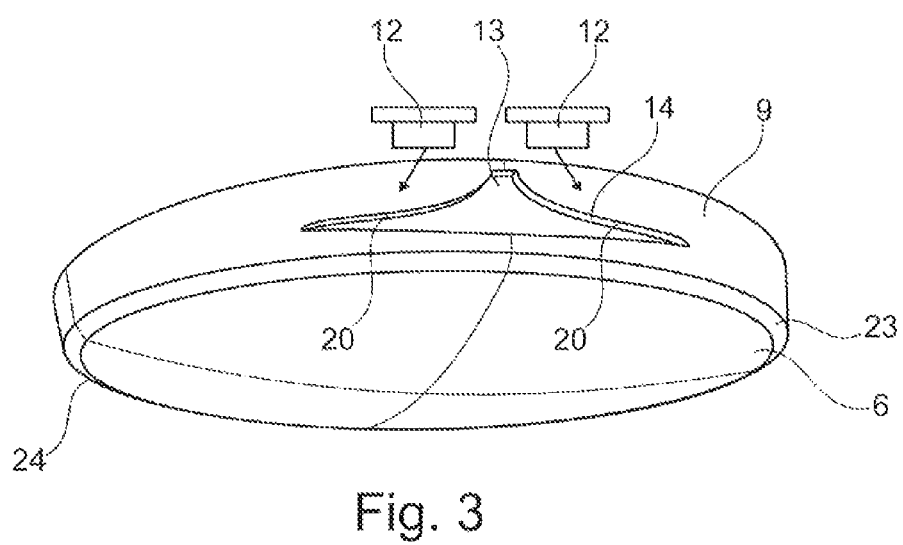
FIG. 3 shows a perspective illustration of a light conductor according to the invention.
Figure 4:
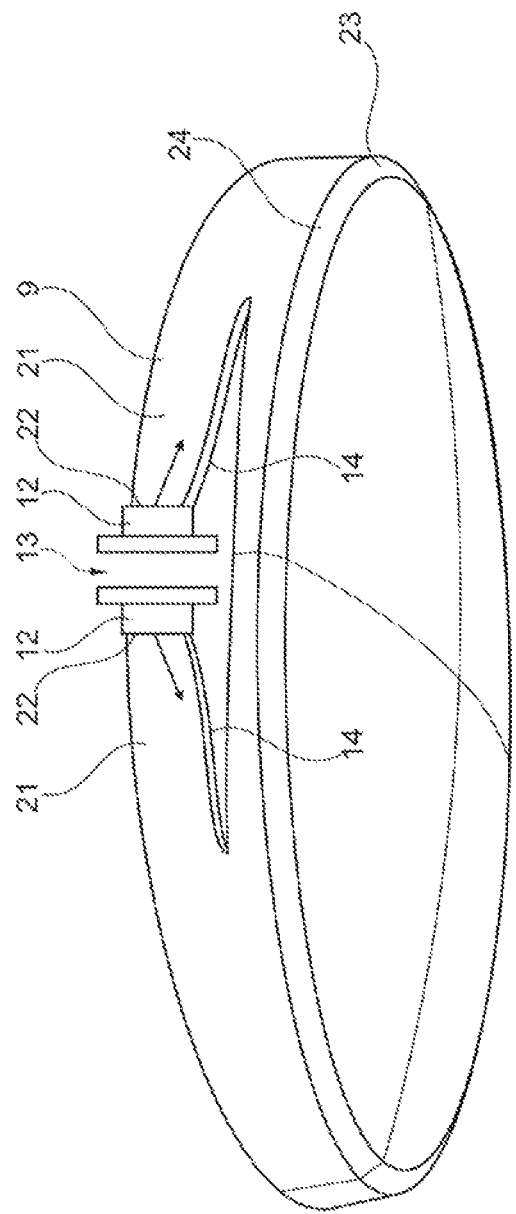
FIG. 4 shows a perspective illustration of a further exemplary embodiment of a light conductor according to the invention.

The raised edge region 9 here has at least one light coupling-in region 11 at which at least one illuminant 12 is arranged, for coupling light into the raised edge region 9. In this case, as FIGS. 2 to 4 show, deflecting means are provided in the region of the raised edge region 9, by means of which light can be deflected or is deflected from the at least one edge region 9 in the circumferential direction of the raised edge region 9 and/or in the flat region 10 of the flat light conductor 6. The light of the at least one illuminant 12 is thereby distributed in the raised edge region 9 and/or in the flat region 10, from which it can emerge.

FIGS. 2 to 4 show that the raised edge region 9 is provided with a recess 13 in such a manner that an edge region 14 of the recess 13 is in the form of a flat deflecting means. The light which is fed by the illuminant 12 into the raised edge region is reflected at the flat deflecting means and distributed in the raised edge region 9, in particular in the circumferential direction and in an axial direction.

FIG. 2 shows that the raised edge region 9 is at least partially formed on its end surface 15 with a type of toothing 16 in order to reflect light on the inner side of the toothing 16.

The regions 8 which are formed in a recessed or transparent manner in order to allow light to pass from the light conductor 6 to the front cover 3 can also be seen in FIG. 2. Said regions 8 are formed, for example, figuratively.

FIGS. 2 to 4 show that the edge region 14 of the recess 13 is of curved or parabolic design and serves as the deflecting means. Light which, coming from above or from the end surface 15, strikes against the edge region 14 is deflected and conducted further in the light conductor 6.

It is particularly preferred here if the edge region 14 of the recess 13 forms two opposite flat deflecting means 20 which are in particular arranged symmetrically with respect to each other. As a result, the light can be distributed in the light conductor 6 in both directions. For this purpose, two illuminants 12 are preferably then also provided which are arranged in particular on the end surface 15 adjacent to the deflecting means 20. In particular, the illuminants 12 are designed as LEDs or the like and are placed onto the end surface 15 adjacent and in particular spaced apart from one another.

The raised edge region 9 thus has an end surface 15 which serves as a coupling-in surface for the light of an illuminant 12, wherein the at least one illuminant 12 lies against the coupling-in surface or is arranged adjacent thereto.

The exemplary embodiment of FIG. 4 shows that the recess 13 of the raised edge region 9 is designed in such a manner that at least one partially released tongue 21 is formed which has a coupling-in surface 22 for the light of an illuminant 12, wherein the at least one illuminant 12 lies against the coupling-in surface 22 or is arranged adjacent thereto. The coupling-in surface 22 forms a circumferential end of the tongue 21.

In the exemplary embodiment of FIG. 4, two partially released tongues 21 are formed which lie opposite each other, wherein the respective coupling-in surfaces 22 lie opposite each other, and the illuminants 12 are arranged between the two coupling-in surfaces 22 of the tongue 21.

For the deflection of the light from the raised edge region 9 towards the flat region 10, interfering optics 24 are arranged in the transition region 23 between the raised edge region 9 and the flat region 10, said interfering optics serving as the deflecting means for deflecting the light from the raised edge region 9 into the flat region 10.

For the deflection of the light out of the flat region towards the front cover 3, interfering optics 25, see FIG. 1, are arranged in the flat region 10, said interfering optics serving as the deflecting means for deflecting the light out of the flat region.

Said interfering optics 25 in the flat region are, for example, in the form of eroded surfaces on that side of the flat region 10 which faces away from the front cover 3.

FIG. 1 furthermore shows that the housing base 4 forms a channel region 26 which is in particular completely encircling or only partially encircling and in which the illuminants 12 can be arranged.

The screen 7 can be formed from a deep-drawn film which, for example, can be punched in order to form the regions 8. The non-transparent regions may also be printed, for example. The transparent regions may also be colored, for example, in order to obtain a, for example, milky appearance or impression. The housing base 4 is advantageously adhesively bonded or welded to the front cover 3, wherein they are advantageously produced individually or both from plastic. The housing base 4 is advantageously colored white, black or some other color, wherein, in the case of a white coloring, the degree of reflection is higher.

The front cover 3 can advantageously be produced from a deep-drawn film which advantageously has, for example, plastic, such as, for example, PVC, sprayed therebehind.

LIST OF REFERENCE SIGNS

1 Emblem
2 Housing
3 Front cover
4 Housing base
5 Cavity
6 Light conductor
7 Screen
8 Recessed or transparent region
9 Partially encircling, raised edge region
10 Flat region
11 Light coupling-in region
12 Illuminant
13 Recess
14 Edge region of the recess 13
15 End surface
16 Toothing
20 Deflecting means
21 Tongue
22 Coupling-in surface
23 Transition region
24 Interfering optics
25 Interfering optics
26 Channel region

The invention claimed is:

1. An illuminable emblem comprising:
a housing having a front cover and a rear-side housing base, wherein the front cover is transparent on a front side, wherein the front cover and the housing base are connected to each other and enclose a cavity, wherein a flat light conductor and a screen are arranged in the cavity such that light can emerge from the flat light conductor and can pass through the screen, wherein the screen is transparent at least in regions,
wherein the flat light conductor has an at least partially encircling, raised edge region and a flat region, wherein the at least partially encircling region has at least one light coupling-in surface, wherein at least one illuminant is arranged adjacent to the coupling-in surface and is configured to emit light into the raised edge region through the coupling-in surface, wherein the raised edge region has a recess having a curved edge, wherein the curved edge is configured to deflect light emitted from the at least one illuminant in a circumferential direction and an axial direction.

2. The illuminable emblem according to claim 1, wherein the edge region of the recess is of parabolic design.

3. The illuminable emblem according to claim 1, wherein the recess in the raised edge region has two curved edges which are arranged symmetrically with respect to each other.

4. The illuminable emblem according to claim 1, wherein the raised edge region has an end surface which serves as the coupling-in surface for the light emitted by the at least one illuminant, wherein the at least one illuminant lies against the coupling-in surface or is arranged adjacent thereto.

5. The illuminable emblem according to claim 1, wherein the recess of the raised edge region comprises at least one partially released tongue, wherein the partially released tongue has a coupling-in surface for the light emitted by the at least one illuminant, wherein the at least one illuminant lies against the coupling-in surface or is arranged adjacent thereto.

6. The illuminable emblem according to claim 5, wherein the recess of the raised edge region comprises two partially released tongues which lie opposite each other and project toward one another, wherein each partially released tongue has a coupling-in surface arranged at an end region thereof, wherein the respective coupling-in surfaces are separated by a space and lie opposite each other, and wherein two illuminants are arranged between the two coupling-in surfaces of the tongues.

7. The illuminable emblem according to claim 1, wherein interfering optics are arranged in a transition region between the raised edge region and the flat region, said interfering optics configured to deflect light from the raised edge region into the flat region.

8. The illuminable emblem according to claim 1, wherein interfering optics are arranged in the flat region, said interfering optics configured to deflect light out of the flat region towards the front cover.

9. The illuminable emblem according to claim 8, wherein the interfering optics in the flat region are in the form of eroded surfaces on that side of the flat region which faces away from the front cover.

* * * * *